Feb. 3, 1959　　　L. G. FERGUSON ET AL　　　2,872,052
ELEVATING DOLLY

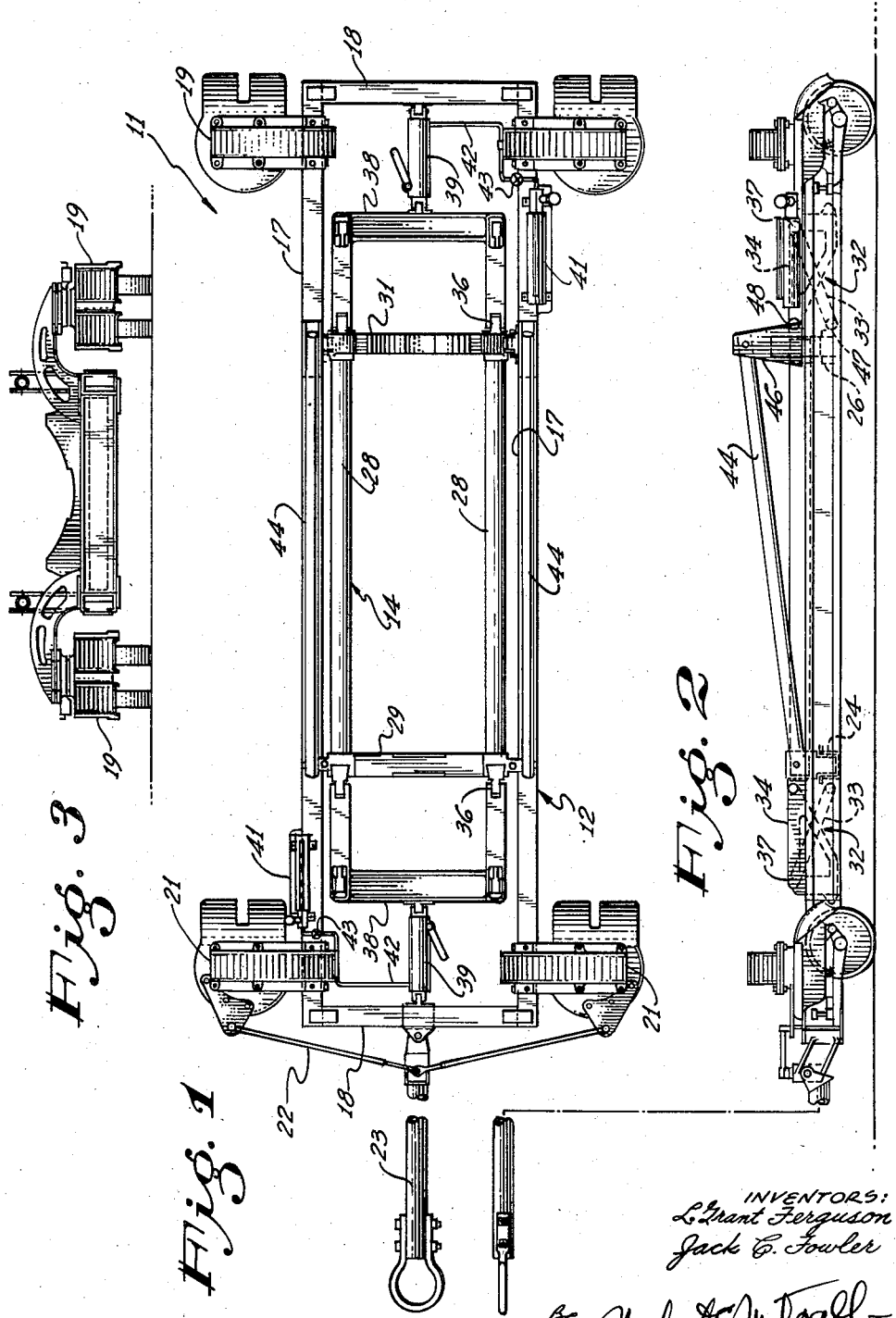

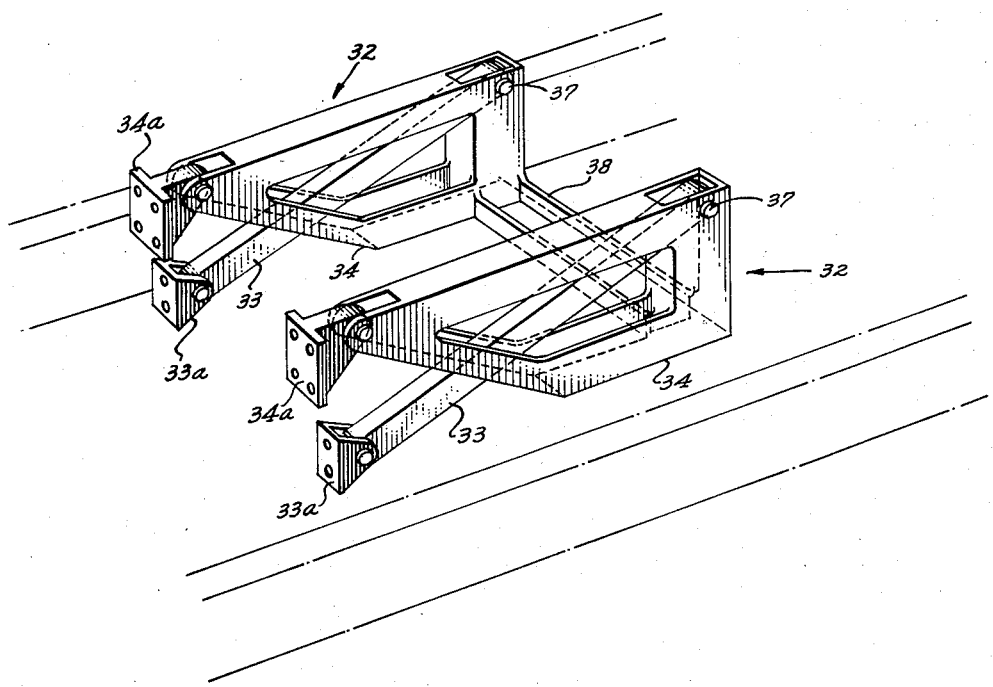

Filed Dec. 7, 1953　　　　　　　　　　　　　3 Sheets-Sheet 3

INVENTORS:
L. Grant Ferguson
Jack C. Fowler

By Herbert E. Metcalf
Their Patent Attorney

United States Patent Office 2,872,052
Patented Feb. 3, 1959

2,872,052

ELEVATING DOLLY

Lachlan Grant Ferguson, Pacific Palisades, and Jack C. Fowler, Los Angeles, Calif., assignors to Northrop Aircraft, Inc., Hawthorne, Calif., a corporation of California Application December 7, 1953, Serial No. 396,412

2 Claims. (Cl. 214—1)

This invention relates generally to dollies having general utility and more particularly to a dolly for general ground transportation and also providing means for elevating and lowering heavy equipment which may be transported thereon.

Among the objects of this invention is to provide a dolly adapted to transport heavy apparatus, such as a jet engine for aircraft, and also provides means whereby the apparatus may be elevated or lowered.

Another object is to provide a dolly having a movable frame adapted to receive and support a piece of heavy equipment either end of which may be elevated or lowered independently, or both ends may be elevated or lowered simultaneously.

Another object is to provide a dolly having safety means precluding failure of the dolly under certain operating conditions.

Another object is to provide a dolly which may be constructed of light material but which is extremely durable and rigid, economical to manufacture, and is flexibly adapted to the purposes for which it is intended.

Briefly the instant invention includes a chassis mounted on caster wheels and a lift frame mounted on the chassis for vertical movement. The lift frame is pivotally attached at its fore and aft ends to the chassis by hydraulically actuated extendable link assemblies. The chassis and lift frame are also interconnected by brace rods which stabilize the lift frame with respect to the chassis and also preclude the possibility of any of the link assemblies malfunctioning during the operation of the dolly. How the brace rods function will become apparent as the specification progresses.

The aforementioned objects and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims.

In the drawings:

Figure 1 is a plan view of the dolly as disclosed in the instant invention.

Figures 2 and 3 are side and end elevational views, respectively, of the dolly shown in Figure 1.

Figure 4 is a perspective view illustrating pivotal linkage, certain structure of the dolly being shown in dotted line.

Figure 5:
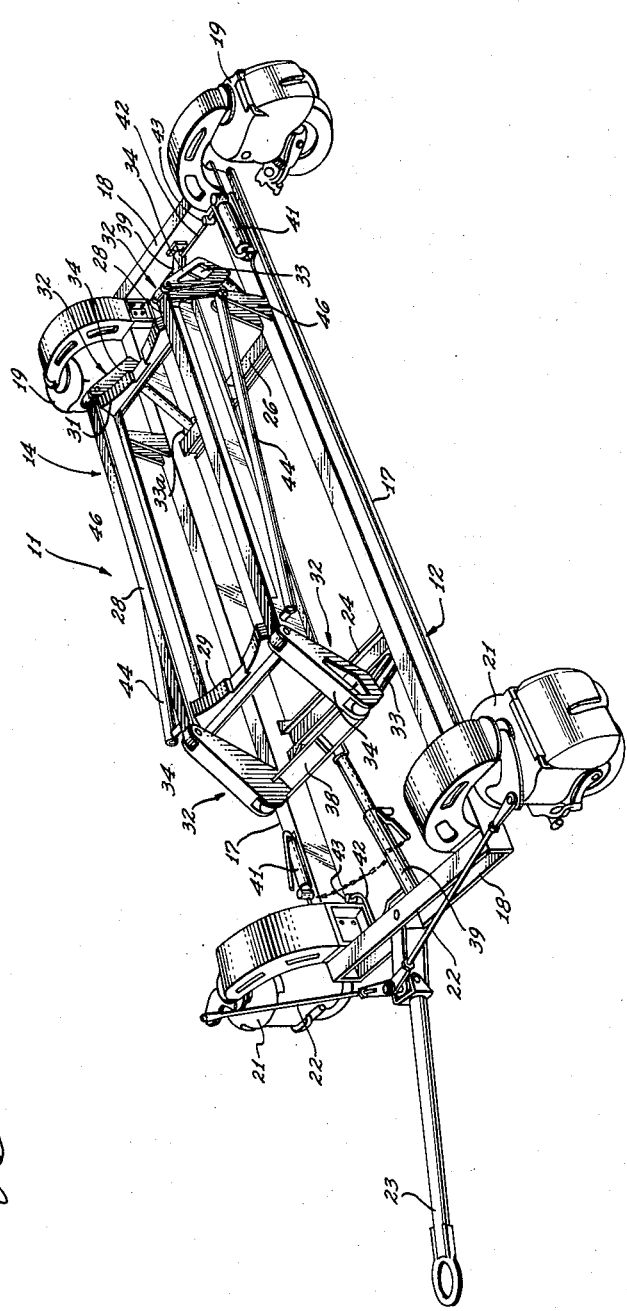
Figure 5 is a perspective view of the dolly in the elevated position.

Referring to the drawing for a detailed description of a preferred embodiment of the present invention, the figures show a dolly 11 comprising two main assemblies, viz., a chassis assembly 12 and a lift frame assembly 14.

The chassis assembly 12 comprises a rectangular frame, as viewed in planform in Figure 1, constructed of extruded structural channels 17 and bars 18 secured together at their end portions by suitable angles, plates, and etc.

Two fully castered wheels 19 are provided at the aft end of the chassis assembly attached to the channels 17, these wheels may be locked in a plurality of positions by conventional means (not shown). Two steerable caster wheels 21 are provided at the forward end of the chassis assembly also attached to the channels 17. A tie rod 22 interconnects the two front caster wheels enabling the dolly to be steered by a tow bar 23. Positioned between and extending normal to channels 17 is a pair of cross channels or beams 24 and 26. Channels or beams 24 and 26 are generally U-shaped in cross-section, the forward channel 24 being attached to channels 17 with its leg portions upstanding while channel 26 is inverted. Due to the fact that the channels or beams are U-shaped they have a pair of legs and a connecting bight; a bight being the middle part of a bend, angle, or corner.

The lift frame assembly 14 also comprises a rectangular frame which is considerably less in length and slightly less in width than the frame constructed of channels 17 and bars 18. The lift frame assembly is constructed of two longitudinally extending extruded tubes 28 and end members 29 and 31, the end members being rigidly secured to tubes 28 at opposite ends thereof. Cross-channels or beams 24 and 26 are located longitudinally with respect to channels 17 so that the distance between channel 24 and the forward bar 18 and the distance between channel 26 and the aft bar 18 is approximately equal. In the assembled position of the lift frame assembly 14 and chassis assembly 12, member 29 is received between the leg portions of channel 24 and rests on the bottom portion thereof, member 31 rests on the top portion of channel 26. The assembled position of the dolly as described above is shown in the figures in which the lift frame assembly 14 is bottomed with respect to the chassis assembly 12. In the instant embodiment the upper surfaces of members 29 and 31 are shaped to receive certain portions of a jet engine, for example, the turbine flange and rest pads thereof. However, these members may be shaped as desired to receive any type of apparatus.

Located at end portions of the lift frame assembly 14 are four jack-knife type link assemblies 32 consisting of links 33 and 34. Each link assembly is identical in construction, accordingly the following brief description of one assembly is applicable to the others. Link 34 is of triangular box type construction while link 33 constitutes a rod provided with a bearing at each of its ends. Two of the links 33 are pivotally attached to the cross channel 24 by brackets 33a at a position below and in line with each of the tubes 28, the other two links 33 are similarly attached to channel 26. Links 34 are pivotally attached by brackets 34a to fittings 36 located in line with and extending from each end of the tubes 28. In the bottomed position of the lift frame and chassis assemblies (as best seen in Figure 2) the free end of each link 33 is adapted to enter a link 34 where it is pivotally secured thereto as indicated at 37. The links 34 positioned at the same end of assembly 14 are secured together by a cross member 38.

A conventional safety type hydraulic actuator 39 is located at each end of the lift frame assembly. The cylinder end of one of the actuators is pivotally attached to one of the bars 18, midway between channels 17, and the piston end is pivotally attached to the adjacent one of channels 38 also at its mid-portion. The other actuator is similarly located and attached at the opposite end of the dolly. Attached at suitable positions on channels 17 is a pair of reservoir and pump assemblies 41 adapted to supply hydraulic fluid at superatmospheric pressure to the actuators 39. Hydraulic lines 42 extend between assemblies 41 and the closed end of actuators 39. Included in each line 42 is a valve 43 whereby fluid may be retained in either actuator or allowed to return to the respective reservoirs as desired.

The lift frame assembly is rendered stable with respect to the chassis assembly by means of a pair of side brace rods 44. With the dolly assembled for operation one of the rods 44 is positioned above each channel 17. One end of each brace rod is pivotally attached to member 29 at opposite sides thereof, the other ends of each of these rods are pivotally attached to upstanding brackets 46, the base portions of brackets 46 being fixedly secured to channels 17 at a position adjacent cross channel 26. The rods 44 preclude the possibility of dolly failure at such time as it is supporting a heavy piece of apparatus and the assembly 14 is caused to assume certain positions. For example, the forward end of assembly 14 may be raised a considerable distance while its aft end is raised only slightly or remains bottomed on channel 26. Under the above conditions a portion of the weight of the apparatus being supported by the dolly will be transmitted in an aft direction through tubes 28 exerting a force which is resisted by the aft linkage assemblies 32. This force may cause the aft links 33 and 34 to move in a counter-clockwise direction about pivot points 47 and 48. The above movement of the aft assembly 32 is not resisted by the aft actuator 39 as its piston rod is free to move in a direction outwardly of its surrounding cylinder. Should the aft linkage assembly malfunction, in the manner prescribed above, assembly 14 would be suddenly lowered which would undoubtedly result in damage to the dolly and apparatus supported thereon. The rods 44 preclude this type of failure as they extend between assemblies 12 and 14 maintaining them in their approximate relative longitudinal relation.

Attention is directed to Figure 5 for a further explanation of the action of lifting the forward end of frame 14. When the actuator 39 has its piston urged outwardly in the manner illustrated the force is transmitted through cross member 38 to the link assemblies 32. Due to the location of pivot 37 frame 14 is lifted vertically. The normal tendency of rods 44 to pivot and pass through an arcuate path of travel is countered by the pivot 37 moving toward the center of the structure. As previously stated certain forces are transmitted aft which is resisted by the aft linkage system. Due to the fact that rod 44 is rigid and a part is connected to frame 12 and 14 that part attached to the latter must rise vertically and not through an arcuate path of travel.

The same analysis may be applied when only the after end of frame 14 is raised.

Additionally, when both ends of the frame 14 are raised and both sets of linkage assemblies 32 are placed in operation the frame 14 is in a sense "squeezed" to a vertical position without the ends of rigid members 44 passing through an arcuate path of travel.

A dolly of the type disclosed herein will be extremely rigid and yet light in weight. The principal members of the chassis and lift frame assemblies constitute aluminum or magnesium extrusions and castings. The linkage assemblies may also constitute aluminum castings.

In operation either end of the lift frame assembly 14 may be raised or lowered independently or both ends may be raised simultaneously. Accordingly if a jet engine is supported on the dolly it may be transported thereon from a storage area to the location where it is to be installed in an aircraft. The engine may then be raised vertically until mounting facilities on the engine contact similar facilities located on the aircraft. The engine may then be secured to the aircraft after which the lift frame assembly 14 is lowered to its bottomed position. The dolly may then be removed from the installation area.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is

1. A dolly for transporting and elevating heavy equipment comprising: a pair of elongated, parallel, spaced apart channels; a bar secured to each end of said channels and spanning the distance therebetween; a second pair of spaced apart, parallel channels spaced from said bars, secured to said first named channels intermediate the ends thereof and spanning the distance therebetween; said second pair of channels being U-shaped in cross section; a substantially coplanar lift frame disposed between the first named channels and bars; a pair of spaced apart, parallel, members on said lift frame; one of said members resting on the bight of one of said second named channels and the other of said members resting on the bight of the other of said second named channels and being embraced by the legs thereof; linkage means on said lift frame and said first named channels; and hydraulic means on said lift frame and said bars and disposed therebetween for lifting said lift frame from the second named channels to an elevated position.

2. A dolly for transporting and elevating heavy equipment comprising: a pair of elongated, parallel, spaced apart channels; a bar secured to each end of said channels and spanning the distance therebetween; a first U-shaped beam secured to said channels spanning the distance therebetween and spaced from said bars; a second U-shaped beam spaced from said first named beam and bars secured to said channels and spanning the distance therebetween; said second named beam being inverted as distinguished from said first named beam; a substantially coplanar lift frame disposed between the first named channels and bars; a pair of spaced apart, parallel members on said lift frame; one of said members resting on the bight of said second beam and the other of said members resting on the bight of the first beam and being embraced by the legs thereof; linkage means on said lift frame and said first named channels; and hydraulic means on said lift frame and said bars and disposed therebetween for lifting said lift frame from the U-shaped beams to an elevated position.

References Cited in the file of this patent

UNITED STATES PATENTS

| | | |
|---|---|---|
| 1,942,945 | Smith | Jan. 9, 1934 |
| 2,449,863 | Ross | Sept. 21, 1948 |
| 2,454,840 | Ryan | Nov. 30, 1948 |
| 2,583,114 | Monteith | Jan. 22, 1952 |